US007306645B2

United States Patent
Kim et al.

(10) Patent No.: US 7,306,645 B2
(45) Date of Patent: Dec. 11, 2007

(54) METHOD FOR CONTROLLING AIR PURIFIER BY USING BIORHYTHM

(75) Inventors: Jeong Yong Kim, Seoul (KR); Kwan Ho Yum, Seoul (KR); Ju Yeon Lee, Gunpo-si (KR); Gi Seop Lee, Incheon (KR)

(73) Assignee: LG Electronics Inc., Seoul (KR)

( * ) Notice: Subject to any disclaimer, the term of this patent is extended or adjusted under 35 U.S.C. 154(b) by 262 days.

(21) Appl. No.: 10/879,045

(22) Filed: Jun. 30, 2004

(65) Prior Publication Data

US 2005/0166760 A1    Aug. 4, 2005

(30) Foreign Application Priority Data

Feb. 2, 2004 (KR) ............... 10-2004-0006723

(51) Int. Cl.
G06F 9/00 (2006.01)
G06F 15/02 (2006.01)
G06F 15/42 (2006.01)
A61L 9/12 (2006.01)
B03C 3/09 (2006.01)

(52) U.S. Cl. ............ 95/26; 364/413; 364/710; 364/715; 713/100; 706/11; 706/14; 706/23; 55/126; 55/136

(58) Field of Classification Search ............ 95/26; 713/100; 364/413
See application file for complete search history.

(56) References Cited

U.S. PATENT DOCUMENTS 4,101,962 A * 7/1978 Hakata ............... 708/161
4,131,790 A * 12/1978 Rebsch ............... 235/89 R
4,253,852 A * 3/1981 Adams ............... 96/58
6,629,242 B2 * 9/2003 Kamiya et al. ......... 713/100

FOREIGN PATENT DOCUMENTS

JP    63-283648    * 11/1988

* cited by examiner

Primary Examiner—Duane Smith
Assistant Examiner—Ives Wu
(74) Attorney, Agent, or Firm—Greenblum & Bernstein, P.L.C.

(57) ABSTRACT

Method for controlling an air purifier by using biorhythm including a first step of calculating total number of days (Delta_Time) a person in a room has lived by using the present year/month/date provided thereto or known through an inner counter, and birth year/month/date of the person in the room provided thereto, a second step of representing a physical rhythm state P_state, an esthetic state E_state, and an intellectual state I_state of the person in the room with the Delta_Time, numerically, a third step of setting a physical weight P-weight, an esthetic weight E, and an intellectual weight in correspondence to the P_state, E_state, and I_state, and a fourth step of controlling operation of the air purifier taking at least one of the P_weight, E_weight, and I_weight into account, whereby operating the purifier according to the biorhythm of the person in the room.

20 Claims, 8 Drawing Sheets

Physical rhythm

Esthetical rhythm

Intellectual rhythm

METHOD FOR CONTROLLING AIR PURIFIER BY USING BIORHYTHM

This application claims the benefit of the Korean Application No. P2004-6723 filed on Feb. 2, 2004, which is hereby incorporated by reference.

BACKGROUND OF THE INVENTION

1. Field of the Invention

The present invention relates to air purifiers, and more particularly, to a method for controlling an air purifier by using a biorhythm.

2. Background of the Related Art

In general, the air purifier filters dust from room air to purify the room air. The air purifier is provided with an oxygen concentrator, an anion generator, and a terpene generator.

Accordingly, the air purifier filters dust from the room air, and performs deodoring. Moreover, the air purifier adds oxygen, anion, and terpene, to the room air, to make room environment more comfortable.

However, because the related art air purifier is operative uniformly according to general statistics of room air pollution, regulation of room air characteristics according to physical and mental states of a person in a room has not been made, at all.

Regardless of a case the physical or mental state is good or bad, the air purifier regulates room air uniformly with reference to general statistics. This room air can not provide a comfortable environment to the person in the room, and give unpleasant feeling at the worst.

SUMMARY OF THE INVENTION

Accordingly, the present invention is directed to a method for controlling an air purifier by using a biorhythm that substantially obviates one or more of the problems due to limitations and disadvantages of the related art.

An object of the present invention is to provide a method for controlling an air purifier by using a biorhythm, which controls room air not uniformly, but provides room air the most suitable to a person in a room according to personal conditions.

Other object of the present invention is to provide a method for controlling an air purifier by using a biorhythm, which can control room air according to physical, esthetic, and intellectual states of a biorhythm.

Additional features and advantages of the invention will be set forth in the description which follows, and in part will be apparent to those having ordinary skill in the art upon examination of the following or may be learned from practice of the invention. The objectives and other advantages of the invention will be realized and attained by the structure particularly pointed out in the written description and claims hereof as well as the appended drawings.

To achieve these objects and other advantages and in accordance with the purpose of the present invention, as embodied and broadly described herein, the method for controlling an air purifier by using biorhythm includes a first step of calculating total number of days (Delta_Time) a person in a room has lived by using the present year/month/date provided thereto or known through an inner counter, and birth year/month/date of the person in the room provided thereto, a second step of representing a physical rhythm state P_state, an esthetic state E_state, and an intellectual state I_state of the person in the room with the Delta_Time, numerically, a third step of setting a physical weight P-weight, an esthetic weight E, and an intellectual weight in correspondence to the P_state, E_state, and I_state, and a fourth step of controlling operation of the air purifier taking at least one of the P_weight, E_weight, and I_weight into account.

The first step includes the steps of calculating total number of days up to the present day (Total_Time) and total number of days (My_Time) up to a birth date of the person in the room, and subtracting the My_time from the Total_Time, to obtain the Delta_Time.

The Total_Time and the My_Time are counted starting from a first day of a year of which remainder after divided by four is zero before a birth year of the person in the room. Or, the Total_Time and the My_Time are counted starting from a first day of a zero year.

The step of calculating the Total_Time includes the steps of calculating total days of years, total days of months, and total days of days according to the present year/month/date, summing the total days, to obtain the Total_Time, and adding unity to the Total_Time in a case the present month is March or later than March, and a remainder of the present year divided by four is zero.

The step of calculating the My_Time includes the steps of calculating total days of years, total days of months, and total days of days according to the birth year/month/date provided thereto, summing the total days, to obtain the My_Time, and adding unity to the My_Time in a case the present month is March or later than March, and a remainder of the present year divided by four is zero.

The total days are calculated setting one year as 365 days, and taking leap years occurring at every four years into account.

The third step includes the steps of setting weights of respective rhythms to the highest values at times the states of the physical, esthetic, and intellectual rhythms shift from "+" to "−", or vice versa, setting weights of respective rhythms to the lowest values at times the states of the physical, esthetic, and intellectual rhythms are "+", and setting weights of respective rhythms to medium values at times the states of the physical, esthetic, and intellectual rhythms are "−".

The second or third step includes the steps of calculating a remainder of the Delta_Time divided by 23, one cycle of the physical rhythm, and setting the remainder as the P_state, if the P_state is any one of zero, 11, and 12, setting the P-weight to "2", if the P_state is below 11, setting the P-weight to "0" (S560), and if the P_state is equal to, or over 12, setting the P-weight to "1".

The second or third step includes the steps of calculating a remainder of the Delta_Time divided by 28, one cycle of the esthetic rhythm, and setting the remainder as the E_state, if the E_state is any one of zero, and 14, setting the E-weight to "2", if the E_state is below 14, setting the E-weight to "0", and if the E_state is equal to, or over 15, setting the E-weight to "1".

The second or third step includes the steps of calculating a remainder of the Delta_Time divided by 33, one cycle of the intellectual rhythm, and setting the remainder as the I_state, if the I_state is any one of zero, 16, and 17, setting the I-weight to "2", if the I_state is below 16, setting the I-weight to "0", and if the I_state is equal to, or over 17, setting the I-weight to "1".

The fourth step includes the steps of setting a safety rate Safety_rate taking the weights of the person in the room into account, and controlling the air purifier according to the Safety_rate.

The step of setting the safety_rate includes the steps of all the set P-weight, E-weight, and I-weight are added, to obtain a sum of total weights Total-weight, if the Total_weight is equal to, or greater than 5, the safety_rate of the person in the room is set to a first level which is the lowest, if the Total_weight is below 5 and equal to or greater than 4, the safety_rate of the person in the room is set to a second level, if the Total_weight is below 4 and equal to or greater than 3, the safety_rate of the person in the room is set to a third level, if the Total_weight is below 3 and equal to, or greater than 2, the safety_rate of the person in the room is set to a fourth level, and if the Total_weight is below 2, the safety_rate of the person in the room is set to a fifth level, the highest.

The step of setting the safety_rate further includes the steps of, if the safety rate is set to the first level, the air purifier is operated in conditions in which air flow is mild breeze, flow direction is indirect, anion is turned off, and aroma is turned on, if the safety rate is set to the second level, the air purifier is operated in conditions in which air flow is mild breeze, flow direction is indirect, anion is turned off, and aroma is turned on, if the safety rate is set to the third level, the air purifier is operated in conditions in which air flow is mild breeze, air flow direction is indirect, anion is turned off, and aroma is turned off, if the safety rate is set to the fourth level, the air purifier is operated in conditions in which air flow is maintained, flow direction is maintained, anion is turned on, and aroma is turned off, and, if the safety rate is set to the fifth level, the air purifier is operated in conditions in which air flow is maintained, flow direction is maintained, anion is turned on, and aroma is turned off.

In the meantime, alternatively, the fourth step includes the steps of all the set P-weight, E-weight, and I-weight are added, to obtain a sum of total weights Total-weight, if the Total_weight is equal to, or greater than 5, the air purifier is operated in conditions in which air flow is mild breeze, flow direction is indirect, anion is turned off, and aroma is turned on, if the Total_weight is below 5 and equal to or greater than 4, the air purifier is operated in conditions in which air flow is mild breeze, flow direction is indirect, anion is turned off, and aroma is turned on, if the Total_weight is below 4 and equal to or greater than 3, the air purifier is operated in conditions in which air flow is mild breeze, flow direction is indirect, anion is turned off, and aroma is turned off, if the Total_weight is below 3 and equal to, or greater than 2, the air purifier is operated in conditions in which air flow is maintained, flow direction is maintained, anion is turned on, and aroma is turned off, and if the Total_weight is below 2, the air purifier is operated in conditions in which air flow is maintained, flow direction is maintained, anion is turned on, and aroma is turned off.

In other aspect of the present invention, there is provided a method for controlling an air purifier by using biorhythm including a first step of calculating total number of days Total_Time up to the present date by using the present year/month/date set by an inner counter or provided thereto, and total days My_Time up to the birth date by using birth year/month/date of a person in the room provided thereto, a second step of subtracting the My_Time from the Total_Time, to obtain total number of days (Delta_Time) the person in the room has lived, a third step of respectively representing a physical rhythm state P_state, an esthetic state E_state, and an intellectual state I_state of the person in the room with the Delta_Time numerically, and setting a physical weight P-weight, an esthetic weight E, and an intellectual weight I in correspondence to the P_state, E_state, and I_state, and a fourth step of setting a safety rate of the person in the room by using at least one of the P_weight, E_weight, and I_weight, and controlling operation of the air purifier according to the safety rate.

The step of calculating the Total_Time includes the steps of calculating total days of years, total days of months, and total days of days from the present year/month/date to a first day of a '0' year, summing the total days, to obtain the Total_Time, and adding unity to the Total_Time in a case the present month is March or later than March, and a remainder of the present year divided by four is zero.

The step of calculating the My_Time includes the steps of calculating total days of years, total days of months, and total days of days according to the birth year/month/date provided thereto, summing the total days, to obtain the My_Time, and adding unity to the My_Time in a case the present month is March or later than March, and a remainder of the present year divided by four is zero.

Third step includes the steps of setting remainders of the Delta_Time divided by one cycles of the physical, esthetic, and intellectual rhythms as states of the physical, esthetic, and intellectual rhythms, setting weights of respective rhythms to the highest values at times the states of the physical, esthetic, and intellectual rhythms shift from "+" to "−", or vice versa, setting weights of respective rhythms to medium values at times the states of the physical, esthetic, and intellectual rhythms are "−", and setting weights of respective rhythms to the lowest values at times the states of the physical, esthetic, and intellectual rhythms are "+".

The fourth step includes the steps of setting a safety rate of the person in the room according to the sum of the physical, esthetic, and intellectual weights, and controlling operation of air flow, flow direction, anion, and aroma of the air purifier according to the safety rate.

It is to be understood that both the foregoing description and the following detailed description of the present invention are exemplary and explanatory and are intended to provide further explanation of the invention claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE PREFERRED EMBODIMENT

Reference will now be made in detail to the preferred embodiments of the present invention, examples of which are illustrated in the accompanying drawings. In describing the embodiments, same parts will be given the same names and reference symbols, and repetitive description of which will be omitted. A method for controlling an air purifier of the present invention will be described with reference to FIGS. 1~8.

The air purifier of the present invention detects physical, and mental states of a person in a room by using a biorhythm algorithm. The biorhythm has a physical rhythm, an esthetic rhythm, and an intellectual rhythm.

Figure 8A:
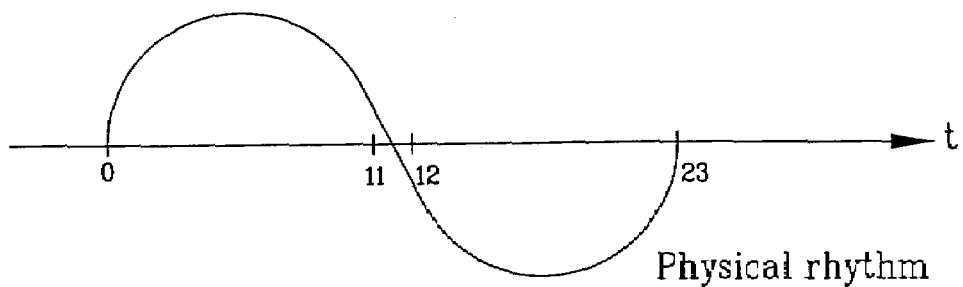
FIG. 8A illustrates a timing diagram of a cycle of a physical rhythm.
Figure 8B:
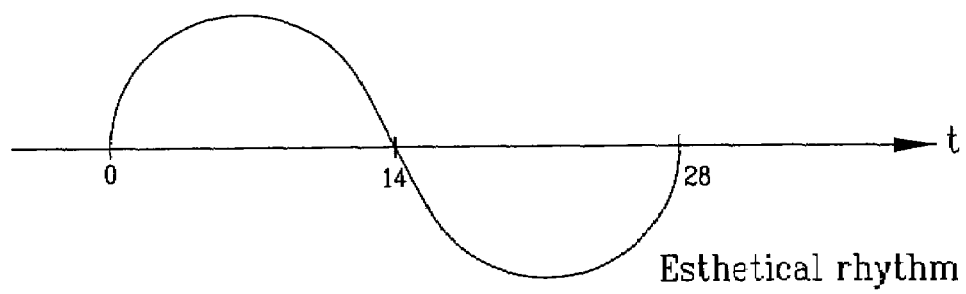
FIG. 8B illustrates a timing diagram of a cycle of an esthetic rhythm.
Figure 8C:
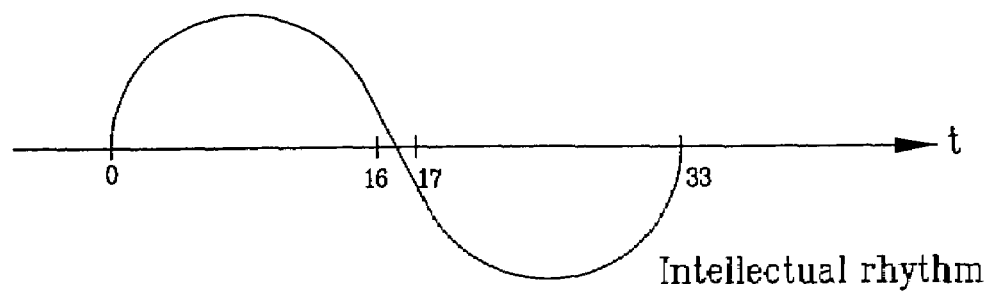
FIG. 8C illustrates a timing diagram of a cycle of an intellectual rhythm.

FIGS. 8A, 8B, and 8C illustrate timings diagrams each showing change of a biorhythm vs. time.

As shown in FIG. 8A, the physical rhythm moves up/down in a 23 day cycle starting from a date of birth. As shown in FIG. 8B, the esthetic rhythm that controls the sympathetic nerve system that is an origin of emotion moves up/down in a 28 day cycle. As shown in FIG. 8C, the intellectual rhythm that controls activity of brain cells moves up/down in a 33 day cycle.

Figure 1:
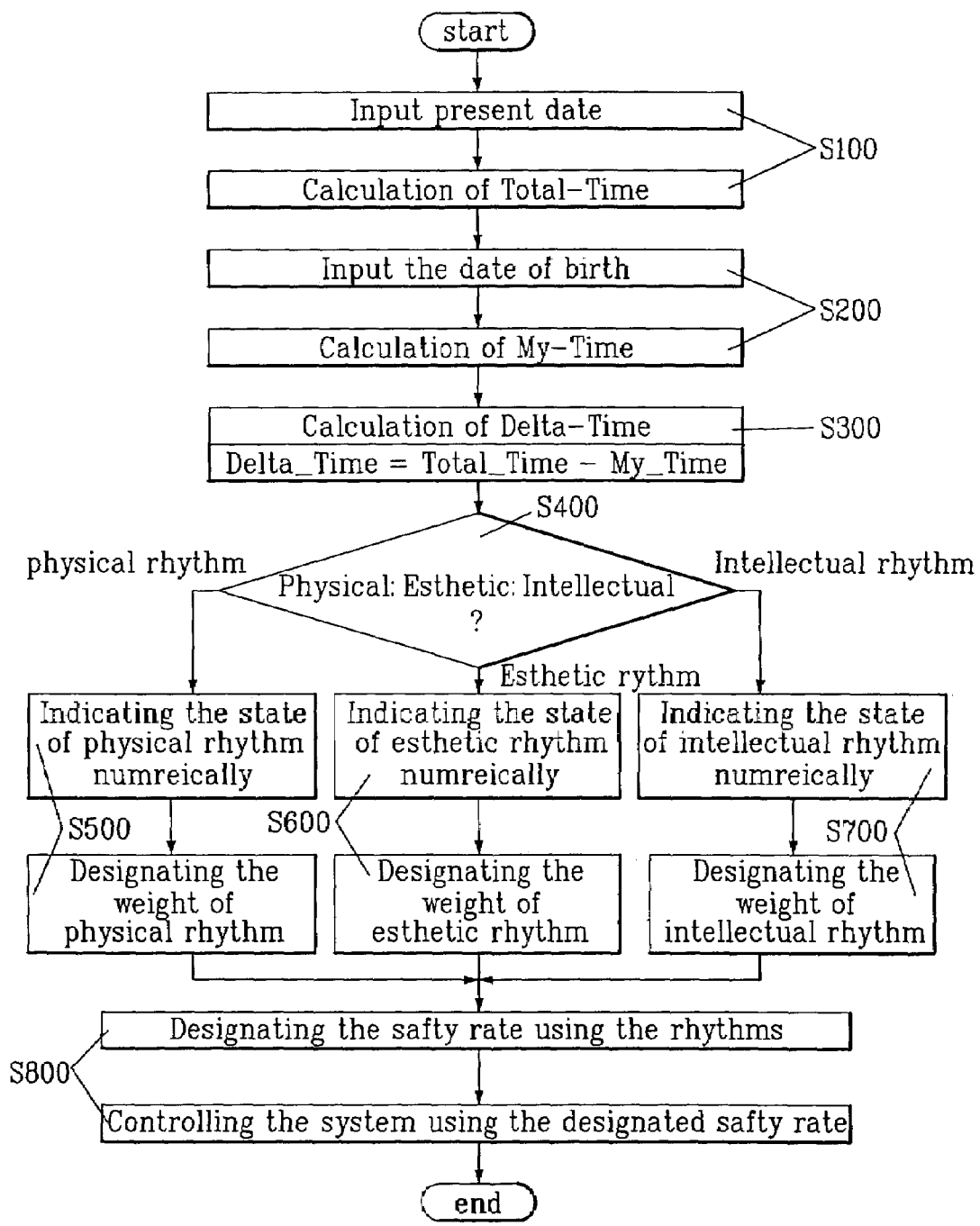
FIG. 1 illustrates a flow chart showing the steps of a method for controlling an air purifier by using biorhythm in accordance with a preferred embodiment of the present invention.

FIG. 1 illustrates a flow chart showing the steps of a method for controlling an air purifier by using biorhythm in accordance with a preferred embodiment of the present invention.

Referring to FIG. 1, when the present year/month/date is provided to a memory in the air purifier by a user, or set by a counter therein, a calculating part in the air purifier calculates a total number of days up to the present date (S100). The calculating part has a hardware, or software system with a calculating program.

Theoretically, the total number of days are counted starting from a first day of '0' year. Or, the total number of days may be counted starting from a first day of a year before the birth year of the person in the room, of which remainder after divided by 4 is zero.

Figure 2:
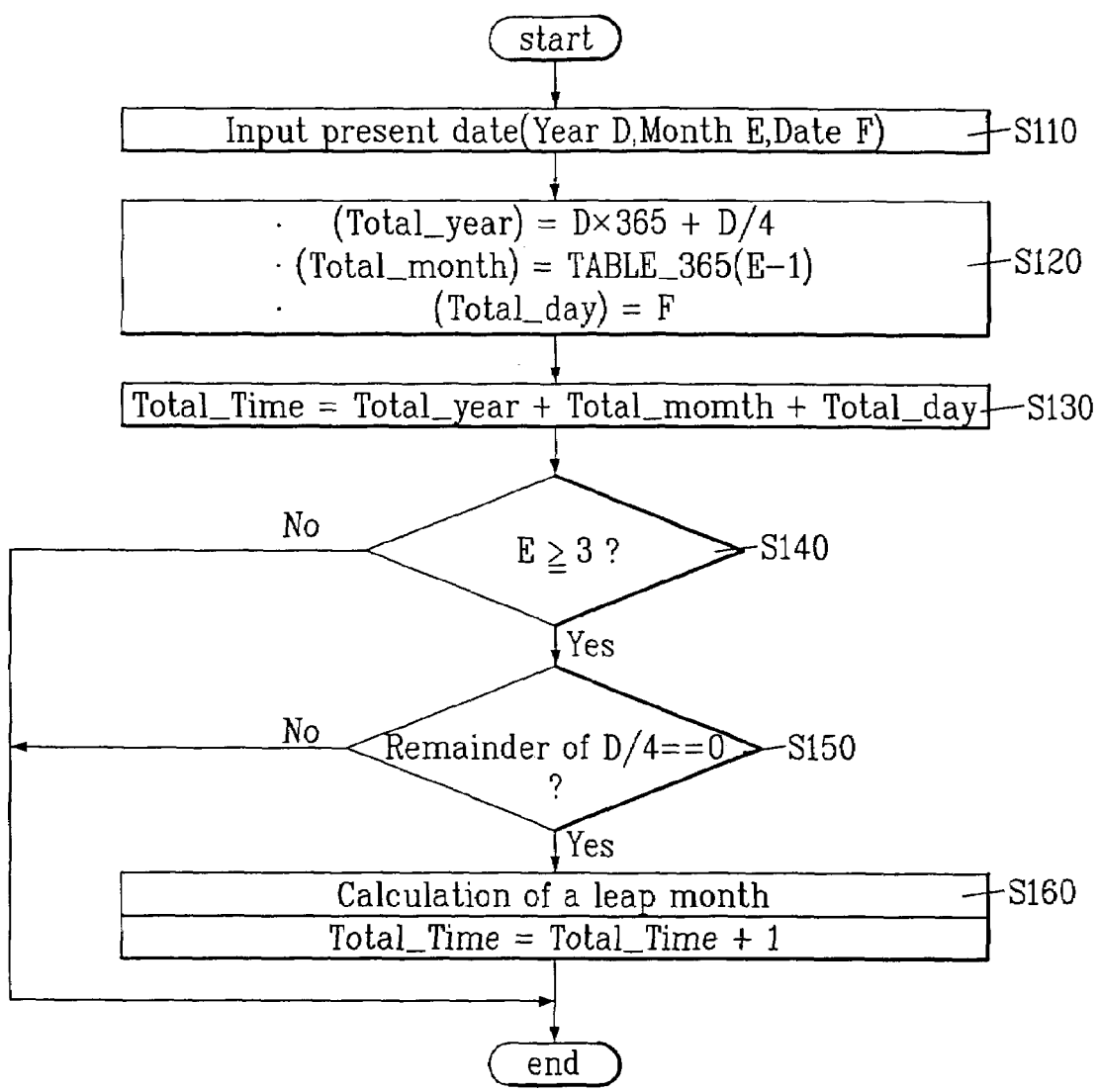
FIG. 2 illustrates a flow chart showing the steps of a method for calculating a Total_Time in FIG. 1.

FIG. 2 illustrates a flow chart showing the steps of a method for calculating a total number of days up to the present day, in detail.

Referring to FIG. 2, the person in the room provides the present date of "D year, E month, and F day" to the memory in the air purifier through an input part (S110). Then, the calculating part calculates total days of years, total days of months, and total days of days (S120). The total days of years are set as a Total_year, the total days of months are set as a Total_month, and the total days of days are set as a Total_day respectively.

In calculating the total days of months, a sum on the following table 1 is used. In this instance, the calculating part sets one year as 365 days, and takes a leap year occurring every four years into account. The total days are counted starting from the starting day of counting described before accumulatively, and adds one day to days of a February at every four years.

Above total days can be expressed as the following equation (1).

$$\text{Total\_year} = D \times 365 + D/4$$

$$\text{Total\_month} = \text{TABLE\_365}(E-1)$$

$$\text{Total\_day} = F \qquad \text{Equation (1)}$$

By adding the Total_year, Total_month, and Total_day, calculated according to the equation (1), total days up to now is calculated, and the calculated value is set as a Total_Time (S130). The Total_month is calculated according to the following table 1. For an example, if the present month is an April, a sum of a (4 −1)month is used.

If the 'E' month is a March or a month later than March (S140), and remainder of the D year divided by four is zero (S150), i.e., March, or a month later than March in a leap year, unity is added to the Total_time (S160).

TABLE 1

|           | Number of days | Sum |
|-----------|----------------|-----|
| January   | 31             | 31  |
| February  | 28             | 59  |
| March     | 31             | 90  |
| April     | 30             | 120 |
| May       | 31             | 151 |
| June      | 30             | 181 |
| July      | 31             | 212 |
| August    | 31             | 243 |
| September | 30             | 273 |
| October   | 31             | 304 |
| November  | 30             | 334 |
| December  | 31             | 365 |
| Total     | 365            | 365 |

Thus, upon setting the Total_Time, the person in the room provides his birth year, month, and date to the memory, so that the calculating part calculates total days up to the birth day (S200). In this instance, theoretically, the total days are counted starting from a first day of a '0' year. Or, the total days may be counted starting from a first day of a year before a birth year of the person in the room, of which remainder after divided by four is zero.

Figure 3:
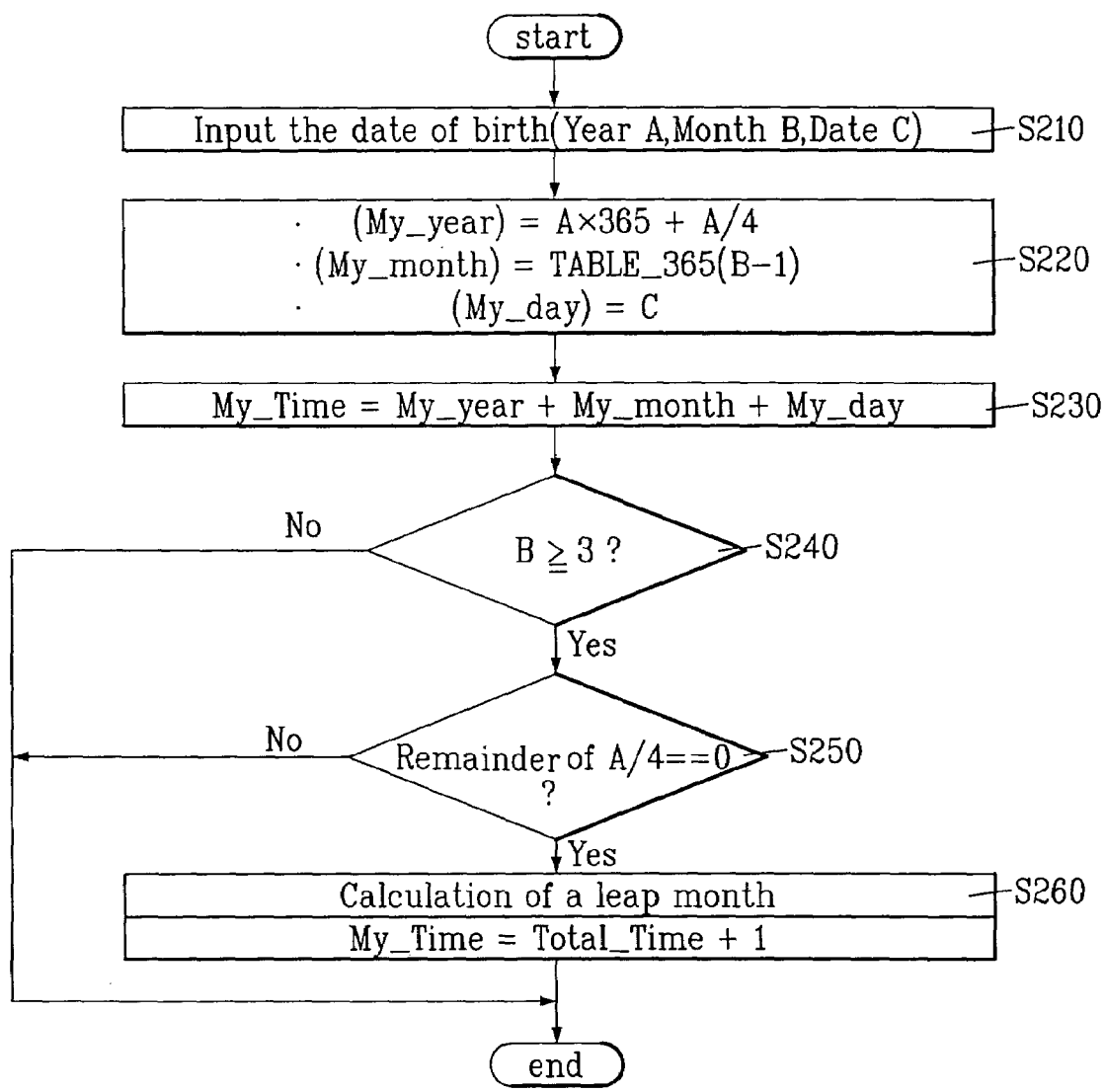
FIG. 3 illustrates a flow chart showing the steps of a method for calculating a My_Time in FIG. 1.

FIG. 3 illustrates a flow chart showing the steps of a method for calculating total days up to the birth day in accordance with a preferred embodiment of the present invention.

Referring to FIG. 3, the person in the room stores his birth year, month, and date "A year, B month, and C date" in the memory (S210).

Then, the calculating part calculates total days of years, total day of months, and total days of days, and sets the total days of years, total day of months, and total days of days as My_year, My_month, and My_day (S220). In this instance, the calculating part has one year set to 365 days, and leap years occurring every four years taken into account. In calculation of the total days of the month, the sum on the table 1 is used. Above can be expressed as the following equation (2).

$$\text{My\_year} = A \times 365 + A/4$$

$$\text{My\_month} = \text{TABLE\_365}(B-1)$$

$$\text{My\_day} = C$$

All the My_year, My_month, and My_day, calculated according to the equation (2) are added to obtain total days up to a birth date of the person in the room, and the total days are set as My_time (S230). If the 'B' months in the birth year, month, and date is March, or later than March (S240), and at the same time with this, a remainder of the 'A' year divided by four is '0' (S250), i.e., a leap month and March, or later than March, unity is added to the My_time (S260).

Thus, upon finish of calculation of the Total_Time and My_Time, the My_Time is subtracted from the Total_Time, to obtain days from the birth date to the present time. The calculated value is set as a Delta_Time (S300). Above steps can be expressed by he following equation (3).

$$Delta\_Time=Total\_Time-My\_Time \quad \text{Equation (3)}$$

Alternatively, the Delta_Time may be calculated by the following method.

Upon providing the present date D year, E month, and F date, and a birth date of the person in the room A year, B month, and C date, the Delta_Time can be calculated directly by subtraction. In this case too, a number leap years are calculated between the D year and the A year, and the number is added to the Delta_time.

In this instance, if the B month in the birth year, month, and date is March, or later than March, and, at the same time with this, if a remainder of the A year divided by four is zero, i.e., a leap year and March, or later than March, unity is added to the Delta_Time. Thus, the Delta_Time, days the person in the room has been lived, is calculated.

Biorhythms of the person in the room are evaluated with reference to the Delta_Time in one of the foregoing embodiments.

By using the Delta_time, states of a physical rhythm, an esthetic rhythm, and an intellectual rhythm are represented with numerals, respectively. The states represented with numerals are set as a P-state, an E-state, and an I_state, respectively (S500), (S600), and (S700).

Physical, esthetic, and intellectual weights are provided in correspondence to the P_state, E_state, and I_state, to set P-weight, E-weight, and I-weight, respectively (S500), (S600), and (S700).

A mental state of the person in the room is the most unstable at a time a value of each state shifts from "+" to "−" or vice versa. Therefore, the air purifier, knowing that the time as the most critical state, sets the P-weight, E-weight, and I-weight at this time to '2' respectively, which is the most hazardous.

Knowing that a mental state of a human being is the most stable when the state values of the physical, esthetic, and intellectual rhythm are "+", the air purifier sets the P-weight, E-weight, and I-weight at this time to '0' respectively, which is the least hazardous. If the state values of the physical, esthetic, and intellectual rhythm are "−", weight values of the rhythms are set to "1" respectively, which is a medium level.

Figure 4:
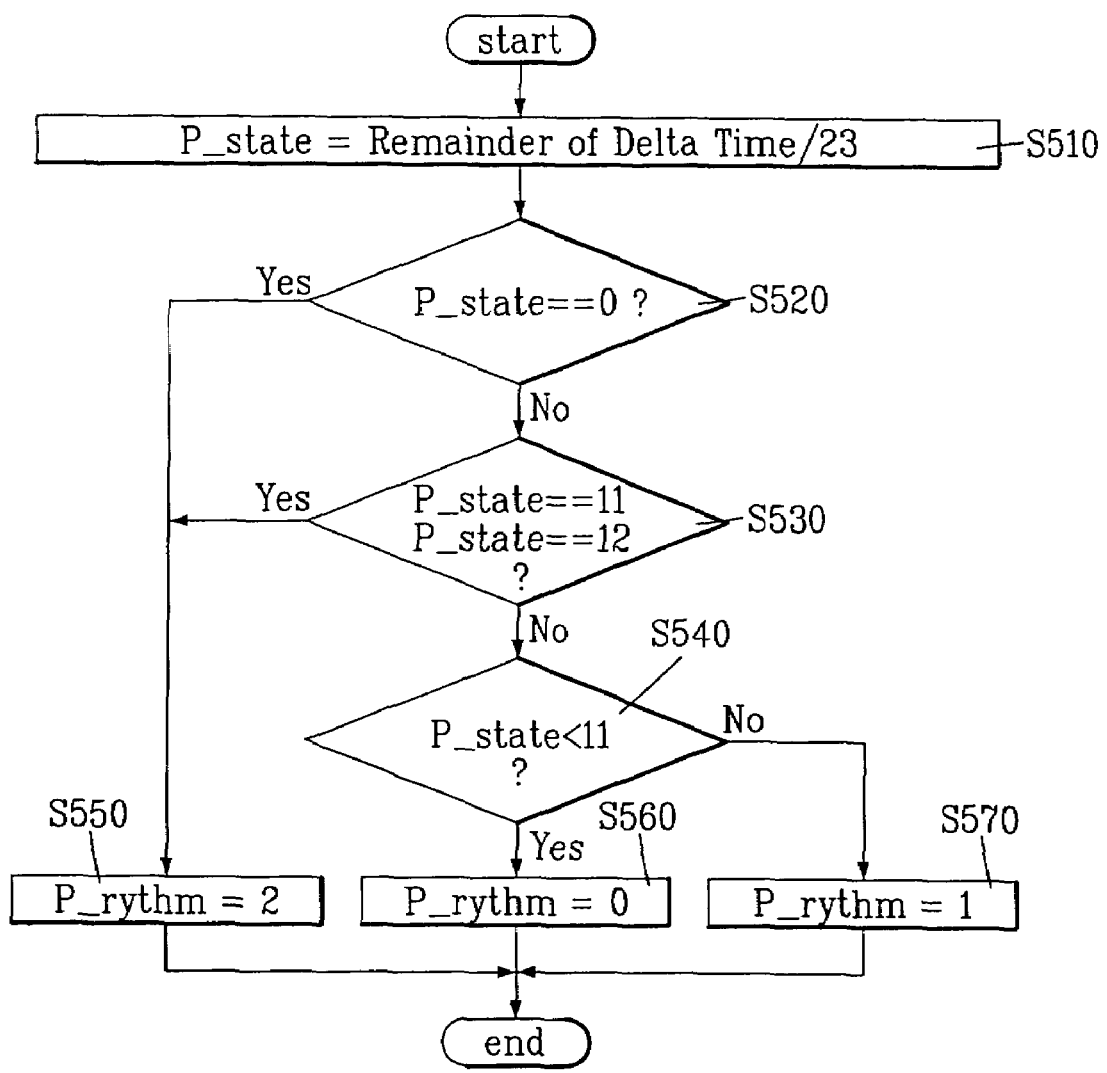
FIG. 4 illustrates a flow chart showing the steps of a method for setting a weighted value according to a physical state of a person in a room in FIG. 1.

FIG. 4 illustrates a flow chart showing the steps of a method for checking a physical state of a person in a room in detail, referring to which a method for setting a physical weight will be described.

Referring to FIG. 8A, as the physical rhythm has 23 day cycle, a remainder of the Delta_Time divided by 23 is calculated. The P_state is represented with the remainder (S510).

If the P_state is any one of zero, 11, 12 (S520), and (S530), the P-weight is set to "2" (S550). If the P_state is below 11 (S540), the P-weight is set to "0" (S560), and if the P_state exceeds 13 (S560), the P-weight is set to "1" (S570).

Figure 5:
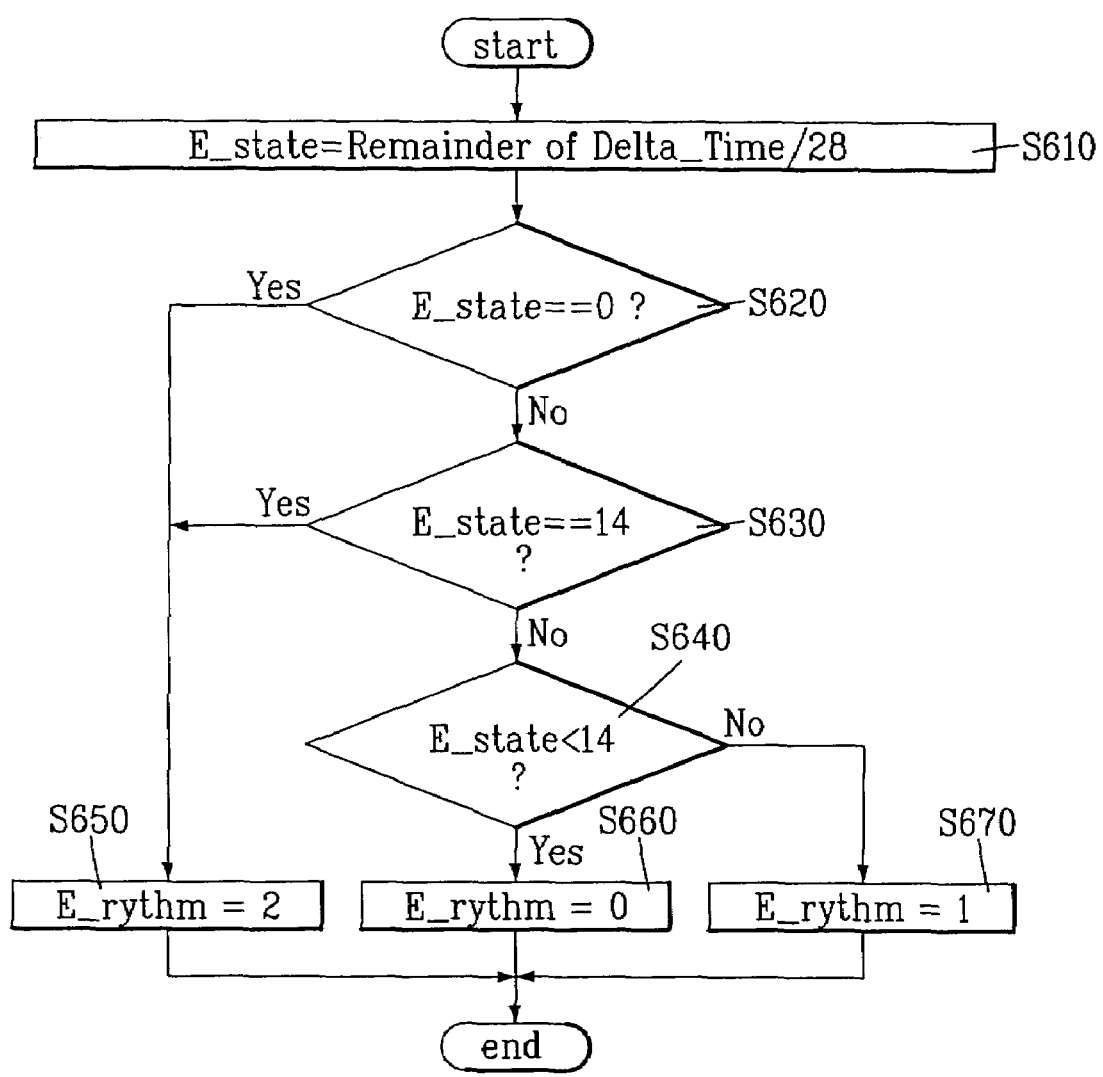
FIG. 5 illustrates a flow chart showing the steps of a method for setting a weighted value according to an esthetic state of a person in a room in FIG. 1.

FIG. 5 illustrates a flow chart showing the steps of a method for checking an esthetic state of a person in a room in detail, referring to which a method for setting a weight of an esthetic state will be described.

Referring to FIG. 8B, as the esthetical rhythm has 28 day cycle, a remainder of the Delta_Time divided by 28 is calculated. The E-state is represented with the remainder (S610).

If the E_state is any one of zero, and 14 (S620), and (S630), the E-weight is set to "2" (S650). If the E_state is below 14 (S640), the E-weight is set to "0" (S660), and if exceeds 14, the E-weight is set to "1" (S670).

Figure 6:
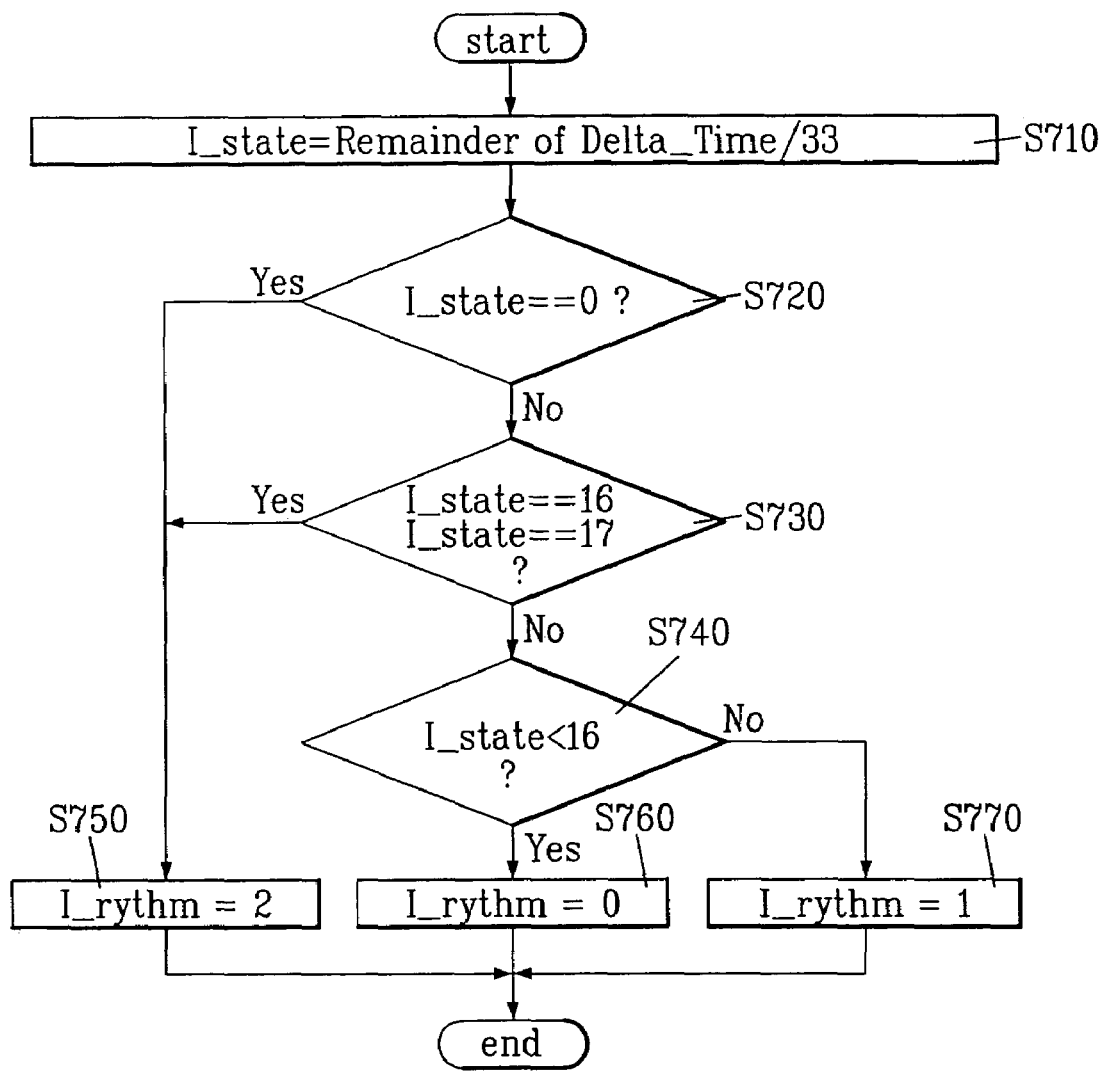
FIG. 6 illustrates a flow chart showing the steps of a method for setting a weighted value according to an intellectual state of a person in a room in FIG. 1.

FIG. 6 illustrates a flow chart showing a method for checking an intellectual state of a person in a room in detail, referring to which the method for setting a weight of an intellectual state will be described.

Referring to FIG. 8C, as the intellectual rhythm has a 33 day cycle, a remainder of the Delta_Time divided by 33 is calculated, and the I-state is represented with the remainder. (S710).

If the I_state is any one of zero, 16, and 17 (S720), and (S730), the I-weight is set to "2" (S750). If the I_state is below 16 (S740), the I-weighted is set to "0" (S760), and if above 17 (S740), the I-weight is set to "1" (S770).

In the meantime, a safety rate safety_rate of the person in the room is set by using the P-weight, E-weight, and I-weight. The air purifier of the present invention controls room air taking the safety rate safety_rate into account (S800).

Figure 7:
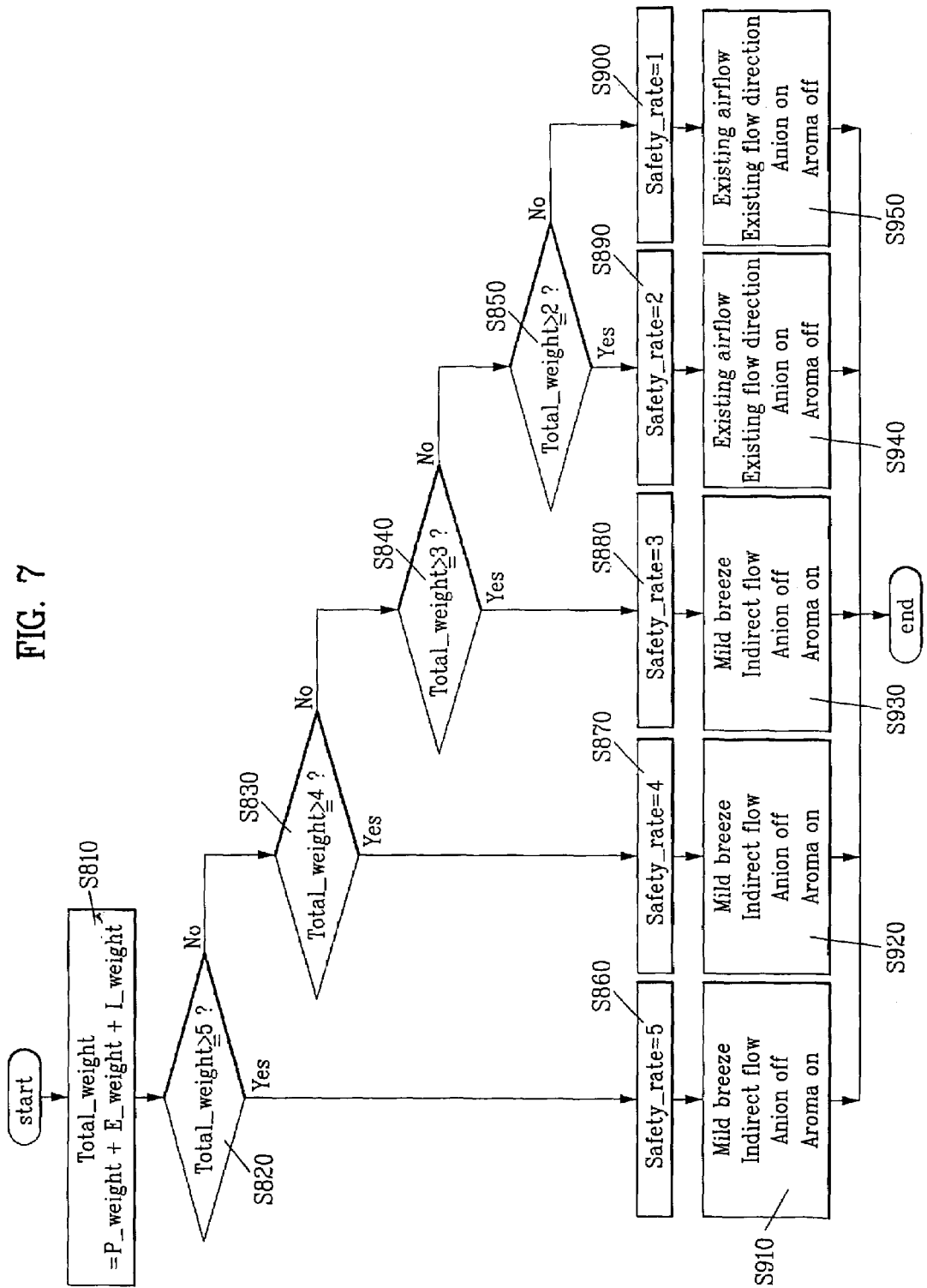
FIG. 7 illustrates a flow chart showing the steps of a method for controlling an air purifier according to a safety rate.

FIG. 7 illustrates a flow chart showing the steps of a method for controlling an air purifier according to a safety rate.

Referring to FIG. 7, all the set P-weight, E-weight, and I-weight are added, to obtain a sum of total weights Total-weight (S810).

If the Total_weight is equal to, or greater than 5 (S820), the safety rate safety_rate of the person in the room is set to "1" (S860), if the Total_weight is below 5 and equal to or greater than 4 (S830), the safety rate safety_rate of the person in the room is set to "2" (S870). If the Total_weight is below 4 and equal to or greater than 3 (S840), the safety rate safety_rate of the person in the room is set to "3" (S880), and if the Total_weight is below 3 and equal to, or greater than 2 (S850), the safety rate safety_rate of the person in the room is set to "4" (S890). Lastly, if the Total_weight is below 2, the safety rate safety_rate of the person in the room is set to "5" (S900).

Accordingly, the safety rate has five stages from "1" to "5". The safety rate "1" represents that a condition of the person in the room is the poorest, and a safety rate "5" represents that a condition of the person in the room is the best. The safety rates given according to the Total_weight are set as one embodiment, and the safety rate can be changed according to setting of manufacturer.

The air purifier of the present invention is controlled according to the safety rate. In a case the safety rate is set to "1" (S860), air flow is mild breeze, flow direction is indirect, anion is turned off, and aroma is turned on (S910). When the safety rate is set to "2" (S870), air flow is mild breeze, flow direction is indirect, anion is turned off, and aroma is turned on (S920). When the safety rate is set to "3" (S880), air flow is mild breeze, air flow direction is indirect, anion is turned off, and aroma is turned off (S930), and when the safety rate is set to "4" (S890), air flow is as before, flow direction is as before, anion is turned on, and aroma is turned off (S940).

Lastly, when the safety rate is set to "5" (S900), air flow is as before, flow direction is as before, anion is turned on, and aroma is turned off (S950).

One embodiment of operation states of the air purifier according to safety rate determination is shown in table 2. The operation states of the air purifier according to safety rate are set as one embodiments, and it is possible to change easily according to setting of the manufacturer.

TABLE 2

| Safety rate | Synthetic judgment | | Operation |
|---|---|---|---|
| 1 | Worst | 222, 221 | Mild breeze, indirect, anion off, aroma on |
| 2 | Bad | 220, 211 | Mild breeze, indirect, anion off, aroma on |
| 3 | Medium | 111, 211 | Mild breeze, indirect, anion off, aroma off |
| 4 | Good | 200, 011 | Maintain, maintain, anion on, aroma off |
| 5 | best | 001, 000 | Maintain, maintain, anion on, aroma off |

On the other hand, in another embodiment of the present invention, instead of setting the safety rate separately, a sum of the weights is calculated, and the air purifier is controlled according to the sum. Since the weights are integers, the sum is also an integer. Accordingly, the control part can control the air purifier in a desired condition according to the integer.

Without proceeding to the safety rate setting step in the foregoing embodiment, the air flow, flow direction, anion, and aroma of the air purifier are controlled directly, according to the sum of the weights.

In the meantime, the control method of the present invention is applicable not only to the air purifier, but also to a general air conditioner, or a ventilating system.

For an example, in a case of a ventilating system, carbon dioxide $CO_2$ contents of the room increases as time goes by as the person in the room respires, to require the room air replaced with an outdoor fresh air from time to time. For this, the ventilating system is used.

The ventilating system cools/heats the outdoor air introduced into the room as a fan is driven to a temperature similar to the room temperature by using a heat exchanger, and discharges to the room. The heat exchanger prevents introduction of sudden cold or hot air. Even in a case the temperature of the outdoor air is controlled, the control method of the present invention is applicable.

As has been described, the method for controlling an air purifier by using a biorhythm of the present invention has the following advantages.

First, since, room air characteristics is controlled, not according to general statistics uniformly, but according to physical, and mental, and intellectual states of a person in the room, a better freshness can be provided to the person.

Second, states of the physical, esthetic, and intellectual rhythms are represented with numerals, and the air purifier can be controlled according to the numerical values. Therefore, the present invention can provide a method for controlling an air purifier very simply according to biorhythm of the person in the room.

What is claimed is:

1. A method for controlling an air purifier by using biorhythm comprising:
setting a physical weight P-weight, an esthetic weight E-weight, and an intellectual weight I-weight in correspondence to a P-state, E-state, and I-state; and
setting a safety rate of the person in the room by using at least one of the P-weight, E-weight, and I-weight, and controlling operation of the air purifier according to the safety rate, wherein the controlling operation includes:
if the safety rate is set to a lowest level, the air purifier is operated in conditions in which air flow is mild breeze, flow direction is indirect, anion is turned off, and aroma is turned on;
if the safety rate is set to a highest level, the air purifier is operated in conditions in which air flow is maintained, flow direction is maintained, anion is turned on, and aroma is turned off.

2. The method as claimed in claim 1, further comprising:
calculating total number of days Delta-Time a person in a room has lived by using the present year/month/date provided thereto or known through an inner counter, and birth year/month/date of the person in the room provided thereto;
representing the P-state, the E-state, and the I-state of the person in the room with the Delta-Time numerically.

3. The method as claimed in claim 2, wherein calculating includes;
calculating total number of days up to the present day (Total-Time) and total number of days (My-Time) up to a birth date of the person in the room, and
subtracting the My-Time from the Total-Time, to obtain the Delta-Time.

4. The method as claimed in claim 3, wherein the Total-Time and the My-Time are counted starting from a first day of a year of which remainder after divided by four is zero before a birth year of the person in the room.

5. The method as claimed in claim 3, wherein the Total-Time and the My-Time are counted starting from a first day of a zero year.

6. The method as claimed in claim 3, wherein calculating the Total-Time includes:
calculating total days of years, total days of months, and total days of days according to the present year/month/date,
summing the total days, to obtain the Total-Time, and
adding unity to the Total-Time in a case the present month is March or later than March, and a remainder of the present year divided by four is zero.

7. The method as claimed in claim 3, wherein calculating the My-Time includes:
calculating the total days of years, total days of months, and total days of days according to the birth year, month, date provided thereto,
summing the total days, to obtain the My-Time, and
adding unity to the My-Time in a case the present month is March or later than March, and a remainder of the present year divided by four is zero.

8. The method as claimed in claim 3, wherein the total days are calculated setting one year as 365 days, and taking leap years occurring at every four years into account.

9. The method as claimed in claim 2, wherein setting includes:
setting weights of respective rhythms to the highest values at times the states of the physical, esthetic, and intellectual rhythms shift from "+" to "−", or vice versa,
setting weights of respective rhythms to the lowest values at times the states of the physical, esthetic, and intellectual rhythms are "+", and
setting weights of respective rhythms to medium values at times the states of the physical, esthetic, and intellectual rhythms are "−".

10. The method as claimed in claim 2, wherein representing includes:
calculating a remainder of the Delta-Time divided by 23, one cycle of the physical rhythm, and setting the remainder as the P-state, if the P-state is any one of zero, 11, and 12, setting the P-weight to "2",
if the P-state is below 11, setting the P-weight to "0", and
if the P-state is equal to, or over 12, setting the P-weight to "1".

11. The method as claimed in claim 2, wherein representing includes:
calculating a remainder of the Delta-Time divided by 28, one cycle of the esthetic rhythm, and setting the remainder as the E-state,
if the E-state is any one of zero, and 14, setting the E-weight to "2",
if the E-state is below 14, setting the E-weight to "0", and
if the E-state is equal to, or over 15, setting the E-weight to "1".

12. The method as claimed in claim 2, wherein representing includes:
calculating a remainder of the Delta-Time divided by 33, one cycle of the intellectual rhythm, and setting the remainder as the I-state,
if the I-state is any one of zero, 16, and 17, setting the I-weight to "2",
if the I-state is below 16, setting the I-weight to "0", and
if the I-state is equal to, or over 17, setting the I-weight to "1".

13. The method as claimed in claim 2, wherein setting the safety rate includes:
all the set P-weight, E-weight, and I-weight are added, to obtain a sum of total weights Total-weight,
if the Total-weight is equal to, or greater than 5, the safety-rate of the person in the room is set to a first level which is the lowest,
if the Total-weight is below 5 and equal to or greater than 4, the safety-rate of the person in the room is set to a second level,
if the Total-weight is below 4 and equal to or greater than 3, the safety-rate of the person in the room is set to a third level,
if the Total-weight is below 3 and equal to, or greater than 2, the safety-rate of the person in the room is set to a fourth level, and
if the Total-weight is below 2, the safety-rate of the person in the room is set to a fifth level, the highest.

14. The method as claimed in claim 13, wherein setting the safety-rate further includes:
if the safety rate is set to the first level, the air purifier is operated in conditions in which air flow is mild breeze, flow direction is indirect, anion is turned off, and aroma is turned on,
if the safety rate is set to the second level, the air purifier is operated in conditions in which air flow is mild breeze, flow direction is indirect, anion is turned off, and aroma is turned on,
if the safety rate is set to the third level, the air purifier is operated in conditions in which air flow is mild breeze, air flow direction is indirect, anion is turned off, and aroma is turned off,
if the safety rate is set to the fourth level, the air purifier is operated in conditions in which air flow is maintained, flow direction is maintained, anion is turned on, and aroma is turned off, and
if the safety rate is set to the fifth level, the air purifier is operated in conditions in which air flow is maintained, flow direction is maintained, anion is turned on, and aroma is turned off.

15. The method as claimed in claim 2, wherein the controlling operation includes:
all the set P-weight, E-weight, and I-weight are added, to obtain a sum of total weights Total-weight,
if the Total-weight is equal to, or greater than 5, the air purifier is operated in conditions in which air flow is mild breeze, flow direction is indirect, anion is turned off, and aroma is turned on,
if the Total-weight is below 5 and equal to or greater than 4, the air purifier is operated in conditions in which air flow is mild breeze, flow direction is indirect, anion is turned off, and aroma is turned on,
if the Total-weight is below 4 and equal to or greater than 3, the air purifier is operated in conditions in which air flow is mild breeze, flow direction is indirect, anion is turned off, and aroma is turned off,
if the Total-weight is below 3 and equal to, or greater than 2, the air purifier is operated in conditions in which air flow is maintained, flow direction is maintained, anion is turned on, and aroma is turned off, and
if the Total-weight is below 2, the air purifier is operated in conditions in which air flow is maintained, flow direction is maintained, anion is turned on, and aroma is turned off.

16. A method for controlling an air purifier by using biorhythm comprising:
calculating total number of days Total-Time up to the present date by using the present year/month/date set by an inner counter or provided thereto, and total days My-Time up to the birth date by using birth year/month/date of a person in the room provided thereto;
subtracting the My-Time from the Total-Time, to obtain total number of days (Delta-Time) the person in the room has lived;
respectively representing a physical rhythm state P-state, an esthetic state E-state, and an intellectual state I-state of the person in the room with the Delta-Time numerically, and setting a physical weight P-weight, and esthetic weight E-weight, and an intellectual weight I-weight in correspondence to the P-state, E-state, and I-state; and
setting a safety rate of the person in the room by using at least one of the P-weight, E-weight, and I-weight, and controlling operation of the air purifier according to the safety rate, wherein the controlling operation includes:
if the safety rate is set to a lowest level, the air purifier is operated in conditions in which air flow is mild breeze, flow direction is indirect, anion is turned off, and aroma is turned on;
if the safety rate is set to a highest level, the air purifier is operated in conditions in which air flow is maintained, flow direction is maintained, anion is turned on, and aroma is turned off.

17. The method as claimed in claim 16, wherein calculating the Total-time includes:
calculating total days of years, total days of months, and total days of days from the present year/month/date to a first day of a '0' year,
summing the total days, to obtain the Total-time, and
adding unity to the Total-time in a case the present month is March or later than March, and a remainder of the present year divided by four is zero.

18. The method as claimed in claim 16, wherein calculating My-time includes:
calculating total days of years, total days of months, and total days of days according to the birth year/month/date provided thereto,
summing the total days, to obtain the My-time, and adding unity to the My-time in a case the present month is March or later than March, and a remainder of the present year divided by four is zero.

19. The method as claimed in claim 16, wherein representing includes:

setting remainders of the Delta-Time divided by one cycle of the physical, esthetic, and intellectual rhythms as states of the physical, esthetic, and intellectual rhythms, setting weights of respective rhythms to the highest values at time the states of the physical, esthetic, and intellectual rhythms shift from "+" to "−", or vice versa, setting weights of respective rhythms to medium values at times the states of the physical, esthetic, and intellectual rhythms are "−", and setting weights of respective rhythms to the lowest values at times the states of the physical, esthetic, and intellectual rhythms are "+".

20. The method as claimed in claim 16, wherein setting a safety rate includes:

setting a safety rate of the person in the room according to the sum of the physical, esthetic, and intellectual weights, and controlling operation of air flow, flow direction, anion, and aroma of the air purifier according to the safety rate.

* * * * *